(12) United States Patent
Green et al.

(10) Patent No.: US 10,709,067 B2
(45) Date of Patent: Jul. 14, 2020

(54) SAFETY SYSTEM FOR MOWERS AND MOWER THERWITH

(71) Applicant: AGRO INTELLIGENCE APS, Aarhus N (DK)

(72) Inventors: Ole Green, Lem St. (DK); Claes Lund Dühring Jæger, Skanderborg (DK); Klaus Springer, Lengede (DE); Kjeld Jensen, Odense SV (DK); Kim Arild Steen, Lystrup (DK); Morten Larsen, Vejle (DK); Tom Simonsen, Struer (DK); Jacob Gad Linding, Aarhus N (DK)

(73) Assignee: AGRO INTELLIGENCE APS, Aarhus N (DK)

( * ) Notice: Subject to any disclaimer, the term of this patent is extended or adjusted under 35 U.S.C. 154(b) by 0 days.

(21) Appl. No.: 16/424,719

(22) Filed: May 29, 2019

(65) Prior Publication Data

US 2019/0274252 A1 Sep. 12, 2019

Related U.S. Application Data

(63) Continuation of application No. PCT/DK2017/050395, filed on Nov. 27, 2017.

(30) Foreign Application Priority Data

Nov. 30, 2016 (DK) .................. 2016 70951

(51) Int. Cl.
*A01D 34/00* (2006.01)
*A01D 75/00* (2006.01)
(Continued)

(52) U.S. Cl.
CPC ......... *A01D 75/185* (2013.01); *A01D 34/828* (2013.01); *A01D 2101/00* (2013.01)

(58) Field of Classification Search
CPC ...... A01D 43/00; A01D 43/16; A01D 34/866; A01D 34/863; A01D 34/661; A01D 34/84;
(Continued)

(56) References Cited

U.S. PATENT DOCUMENTS

| 4,104,851 A | 8/1978 | Perry |
| 5,035,107 A * | 7/1991 | Scarborough .......... A01D 43/16 56/10.2 R |

(Continued)

FOREIGN PATENT DOCUMENTS

| DE | 10346818 A1 | 4/2004 |
| EP | 2057886 A2 | 5/2009 |
| EP | 2340701 A2 | 7/2011 |

OTHER PUBLICATIONS

International Search Report and Written Opinion for PCT Patent App. No. PCT/DK2017/050395 (dated Feb. 26, 2018).

*Primary Examiner* — Robert E Pezzuto
(74) *Attorney, Agent, or Firm* — Jones Robb, PLLC

(57) ABSTRACT

Mowers are provided with a safety system to prevent obstacles, such as animals, located in the field from being hit by cutters of the mower. The safety system includes a control unit and at least one detector to detect the obstacle and then provide a warning signal to the control unit, when the obstacle is detected. The control unit provides a separation signal to at least one safety device in response to receiving the warning signal, and the at least one safety device causes separation between the obstacle and the at least one cutter in response to receiving the separation signal. The safety device may be at least one shield which is movable between a retracted position and a protecting position in which it extends in front of the at least one cutter to prevent contact between the at least one cutter and the obstacle.

10 Claims, 6 Drawing Sheets

(51) Int. Cl.
*A01D 75/18* (2006.01)
*A01D 34/82* (2006.01)
*A01D 101/00* (2006.01)

(58) Field of Classification Search
CPC ...... A01D 34/66; A01D 34/64; A01D 34/828; A01D 75/185
USPC ...................... 56/10.4, 13.6, 15.5, 10.6, 17.5
See application file for complete search history.

(56) References Cited

U.S. PATENT DOCUMENTS

| | | | | |
|---|---|---|---|---|
| 6,804,941 | B2* | 10/2004 | Washburn | A01D 34/64 56/10.4 |
| 8,666,550 | B2* | 3/2014 | Anderson | A01D 34/008 700/253 |
| 8,713,904 | B1* | 5/2014 | Goudy | A01D 34/661 56/15.5 |
| 9,137,943 | B2* | 9/2015 | Einecke | A01D 75/185 |
| 2006/0277884 | A1 | 12/2006 | Bucher | |

* cited by examiner

SAFETY SYSTEM FOR MOWERS AND MOWER THERWITH

This application is a continuation of, and claims priority under 35 U.S.C. § 120 to, International App. No. PCT/DK2017/050395, filed 27 Nov. 2017, and claims priority therethrough under 35 U.S.C. §§ 119, 365 to Denmark App. No. PA 2016 70951, filed 30 Nov. 2016, the entireties of which are incorporated by reference herein.

BACKGROUND

Field of Endeavor

The present invention relates to mowers, and in particular to mowers with a safety system to prevent hitting obstacles located in the field being mowed by cutters of the mower. Such obstacles may, e.g., be animals hiding in the plants on the field.

Brief Description of the Related Art

Every year animals get hurt or killed by farming machines, such as tractors provided with mowers, when the grass is being cut. Often the grass is mowed at the same time as when the wild animals are breeding. At this time of the year, the wild animals are very stationary and hide in the grass instead of fleeing. Examples of such animals are baby deer and hares. During mowing, the tractor typically moves with a speed of up to 25-30 km/h, and therefore it can be hard or impossible for the driver to spot if there is something in the field that should not be hit by the mower. This is why the driver sometimes does not notice when the mower hits a wild animal. The risk of such accidental hits is greatest in the edge of the field, especially if the field is close to a windbreak where the animals are most likely to be.

The problem with such hits can be seen from several aspect. One aspect is that if dead animals are picked up with the grass to become feed, they can carry around bacteria, which in the worst case can contaminate, for example, cows or horses. This may result in a potential economic problem for the farmer. Another aspect is that wild animals will get hurt and possibly die by being hit; this is a problem seen from an animal guarding point of view. This can harm the wild animal population and can also be an emotional burden for the driver of the machine, as he is confronted with the mutilated animal.

Another problem with an obstacle being hit by the cutters of a mower is if the obstacle is a stone or similar solid and hard object, as that may cause damage to the cutter.

Hence, an improved mower would be advantageous, and in particular a safer mower would be advantageous.

SUMMARY

One of numerous aspects of the present invention includes a mower with a safety system with which the risk of accidentally hitting an obstacle with a cutter of the mower is lower than with known systems.

Another aspect includes a mower with a safety system with which the risk of accidentally hitting an obstacle with a cutter of the mower is minimized even when the mower continues to move forward past an initial location of the obstacle.

A further aspect provides an alternative to the prior art, in particular, a mower that solves the above-mentioned problems of the prior art.

Thus, the above-described aspects include a mower adapted to be moved along a field with plants to be cut, the mower comprising:
at least one cutter mounted on the mower via a carrier and adapted to cut the plants, and
a safety system comprising:
a control unit,
at least one detector adapted to:
detect a presence of an obstacle in front of the at least one cutter and within a predefined distance from the at least one cutter, and
provide a warning signal to the control unit when the presence of the obstacle is detected, and
at least one safety device adapted to cause a separation between the obstacle and the at least one cutter while the mower is moved forwards,
wherein the control unit provides a separation signal to the at least one safety device in response to receiving the warning signal,
wherein the at least one safety device causes the separation in response to receiving the separation signal, and
wherein the safety system is configured so that the separation is caused fast enough to ensure that the obstacle is not hit by the at least one cutter while the mower is moved forwards at working speed.

The mower may be adapted to be driven forward by a vehicle, such as a tractor, or it may be self-propelled. When the mower is to be pulled behind a tractor, there is typically a carrier on each side of the tractor. The mower may be arranged behind, to the sides of, or in front of the vehicle or a central unit of a self-propelled mower.

Here and in the following, "behind" and "in front of" will be defined in relation to the travelling direction of the mower. Thereby "an obstacle in front of the at least one cutter" means that the obstacle is at a location which has not yet been passed by the cutter but which will be passed when the mower keeps moving forwards.

The obstacle may be an animal, a stone, a branch, a drainage pipe, a well cover, or another item being large enough to be hit by the cutter. As explained above, any such obstacle being hit may cause problems either to an animal being hit, to animals eating the cut plants, or to the cutter.

In some embodiments, the mower may continue to move forwards and will then typically include means to bring the safety device back to an un-activated state after the mower has passed the object. In alternative embodiments, the mower will be braked and stopped automatically or by an action effectuated by a driver. The idea is that the activation of the safety device is significantly faster than braking and stopping of the mower. Hereby the braking and stopping can be done with less deceleration forces acting on the equipment involved. This is particularly relevant for mowers travelling at relatively high speed, as a possible fast braking would involve very high deceleration forces. When the mower is moved by a vehicle driven by a driver, the driver will typically inspect and if necessary move the obstacle out of the driving path of the mower before mowing is continued.

By "moved forwards at working speed" is preferably meant that at the time when the separation between the obstacle and the at least one cutter happens, the mower is still moving forwards at substantially the same speed as before an obstacle is detected. In other words, the separation takes place faster than a possible initiation of a braking and stopping of the mower, if such stopping is necessary. As will be described in further details below, whether or not it is necessary to stop the mower, e.g., to inspect or move the obstacle, depends on the actual embodiment chosen. "Working speed" could also be referred to as "normal working speed" to make it more clear that the intended meaning is the speed with which the mower moves before an obstacle is detected.

After the separation has been actuated and after the obstacle may or may not have been moved, the safety system could be automatically changed back to the normal working condition after a time lapse or upon receipt of a return signal. A driver could, e.g., activate such a return signal when the mower is driven by a vehicle having such a driver.

In presently preferred embodiments, the at least one safety device comprises at least one shield which is movable between a retracted position in which it does not cover the at least one cutter and a protecting position in which it extends in front of the at least one cutter to prevent contact between the at least one cutter and the obstacle. By "does not cover" is preferably meant that it does not cover a region in front of the at least one cutter, which region will be covered when the shield is in the protecting position. In embodiments wherein the mower is driven by a tractor, the driver of the tractor will typically be alarmed when the shield is activated. He can then stop the machinery and check up on what has happened, such as check whether an animal has been hit and, in that case, take appropriate action.

In embodiments having at least one shield, it may be the form of a shovel which is curved or bent away from the at least one cutter so that a lower part of the shovel can be moved at least partly underneath the obstacle. Hereby the chances of having the obstacle being pushed in front of the mower instead of being forced below the shield are increased. This is particularly relevant when the obstacle is an animal as the chances of the animal surviving the meeting with the mower are thereby also highly increased. The animal will then typically be pushed forwards by the shovel until the mower has come to a stop. During the pushing movement, the animal will be at least partly protected by the shovel, e.g., against an otherwise potentially damaging sliding over the ground.

In embodiments comprising at least one shield, it may be hinged to the carrier or to an upper part of the mower and moved from the retracted position to the protecting position by at least one shield actuator. Such a shield actuator may typically be a hydraulic actuator as studies made in relation to the present disclosure have shown that this type of actuator can react fast, which can be an essential characteristic. However, other kinds of actuators, such as electrically actuated actuators, are also covered by the present disclosure.

In alternative embodiments, the at least one safety device may comprise at least one airbag which, upon activation, by receipt of the separation signal, expands and thereby lifts the carrier with the at least one cutter to such a height above the field that the at least one cutter can pass above the obstacle without hitting it. When the mower has passed the obstacle, the airbag will empty, and the mower can continue moving forward.

In other alternative embodiments, the at least one safety device may comprise:

at least one slider actuator with an upper end connected to the carrier, and at least one slider mounted at a lower end of the slider actuator, wherein the separation signal actuates the slider actuator to assume an extended state so that the slider slides along the field while the carrier is lifted to such a height that the at least one cutter can pass above the obstacle without hitting it.

In other alternative embodiments, the at least one safety device may comprise at least one pivot actuator adapted to pivotally move the carrier with the at least one cutter into a non-working position in which the at least one cutter does not hit the obstacle.

In embodiments comprising such at least one pivot actuator, the non-working position may be obtained by pivoting the carrier around a substantially horizontal axis so that the at least one cutter is lifted to a higher position in relation to the field. Such a higher position may, e.g., be a position corresponding to the one in which the carrier is stored during transportation of the mower. The carrier may, e.g., extend substantially vertically.

Alternatively, the non-working position may be obtained by pivoting the carrier around a substantially vertical axis so that the at least one cutter is moved in an opposite direction of a moving direction of the mower, i.e., extending behind the axis of rotation, such as extending behind the mower.

In any of the embodiments described, the at least one detector may be selected from the group consisting of: RGB camera, thermal camera, radar, or laser. Tests made in relation to the development of the present disclosure have already demonstrated that RGB cameras work as intended for this use. Radar technology may be particularly suitable for detecting obstacles fully covered by grass or crop as radar waves can easily penetrate such plant material.

In any of the embodiments described, the at least one cutter may comprise at least one rotating blade. Alternatively, the at least one cutter may be in the form of a cutting knife, also referred to as a finger cutter, or a chopper cutter. In embodiments with rotating blades, the safety system may further comprise at least one brake adapted to stop the rotation of the at least one rotating blade, and the control unit may provide a braking signal to the at least one brake in response to receiving the warning signal which braking signal results in the rotation of the at least one rotating blade being stopped by the at least one brake. This is particularly advantageous in relation to embodiments where the carrier with the at least one cutter is lifted to pass above the obstacle. By stopping the rotation of the at least one rotating blade, the risk of hurting an obstacle in the form of an animal is minimized.

Specific aspects will be apparent from and elucidated with reference to the embodiments described hereinafter.

BRIEF DESCRIPTION OF THE DRAWINGS

A mower according to the present disclosure will be described in more detail with regard to the accompanying figures. The figures show one way of implementing the subject matter hereof and is not to be construed as being limiting to other possible embodiments falling within the scope of the attached claim set.

DETAILED DESCRIPTION OF EXEMPLARY EMBODIMENTS

Figure 1:
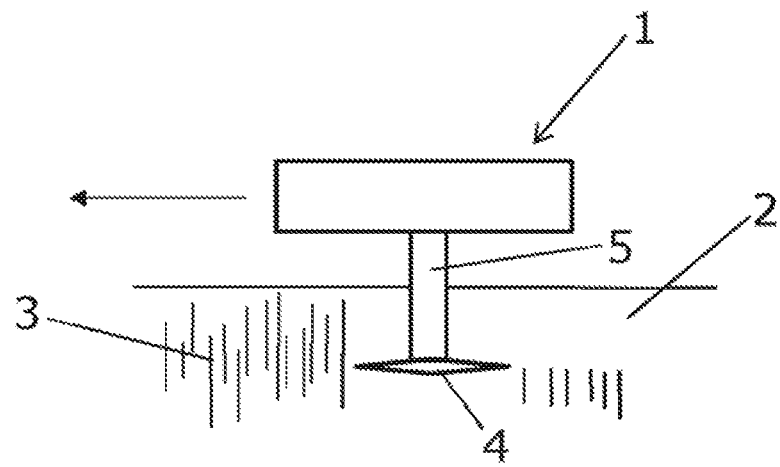
FIG. 1 schematically shows a mower being moved across a field.
Figure 2:
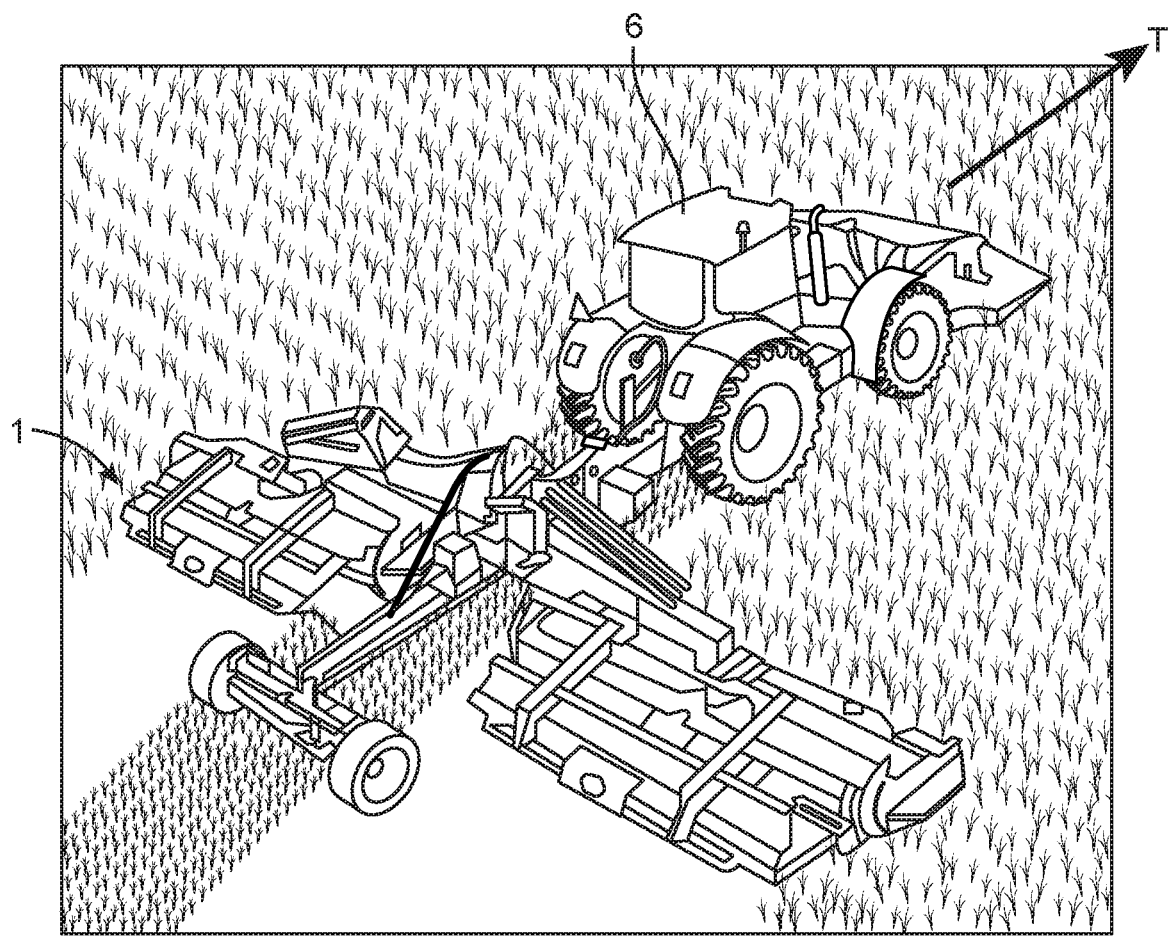
FIG. 2 shows a photo of an embodiment of the invention in the form of a mower being driven by a tractor.

FIG. 1 schematically shows a mower 1 adapted to be moved along a field 2 with plants 3 to be cut. The mower 1 includes at least one cutter 4 mounted on the mower 1 via a carrier 5 and adapted to cut the plants 3. The mower 1 may be adapted to be driven forwards by a vehicle, such as tractor, or it may be self-propelled. FIG. 2 shows a photo of an example of a mower 1 which is pulled behind a tractor 6 and extending sideward with respect to a travelling direction T of the tractor 6. In such embodiments, there is typically a carrier 5 on each side of the tractor 6, but there may also be a carrier 5 on one side only. This will typically be the case for mowers 1 intended to mow grass next to a road. For other embodiments, the mower may be arranged behind, to the sides of, or in front of the vehicle or a central unit of a self-propelled mower. The at least one cutter typically includes at least one rotating blade.

Figure 3:
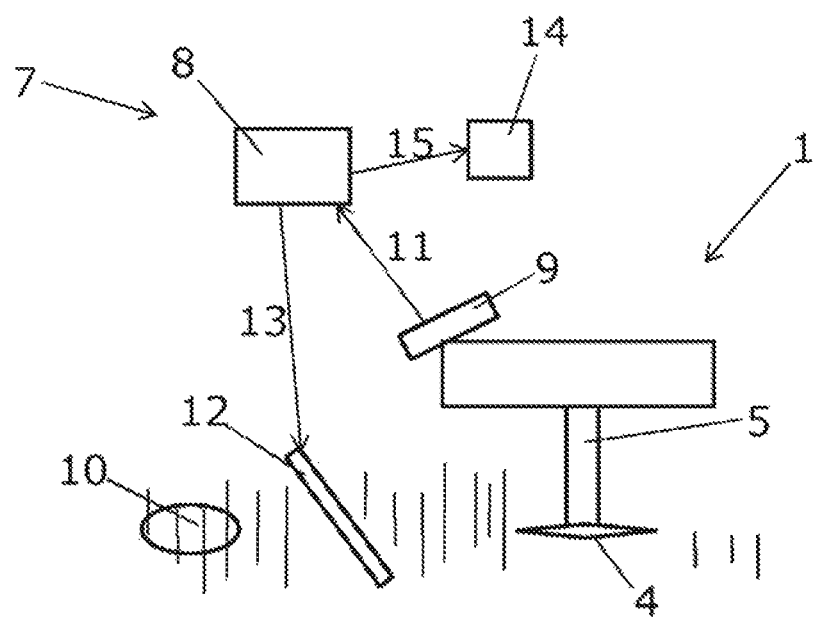
FIG. 3 schematically shows the overall idea of the present disclosure.
Figure 4A:
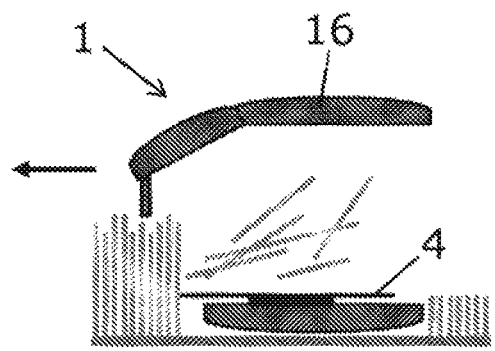
FIGS. 4A-4E schematically show another illustration of the overall idea of the present disclosure.
Figure 4B:
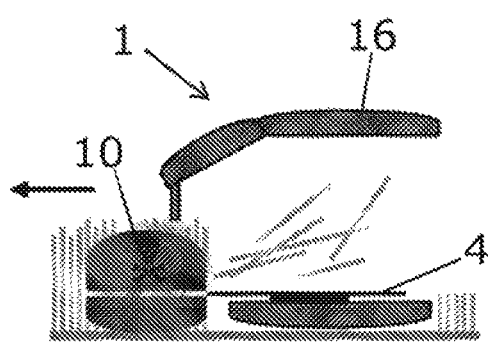
Figure 4C:
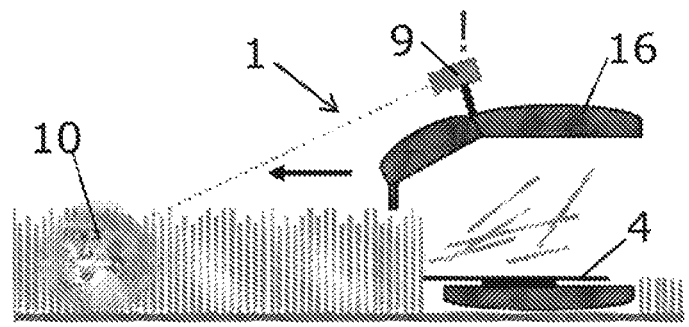
Figure 4D:
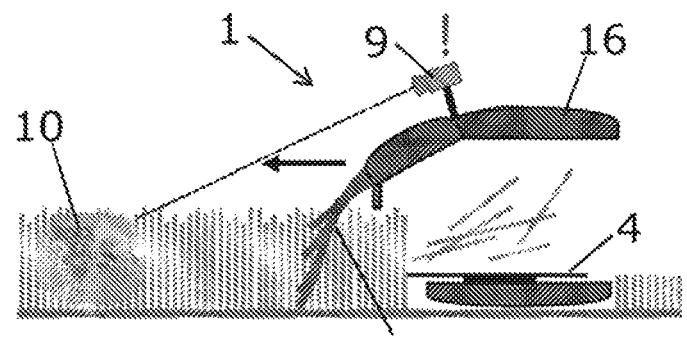
Figure 4E:
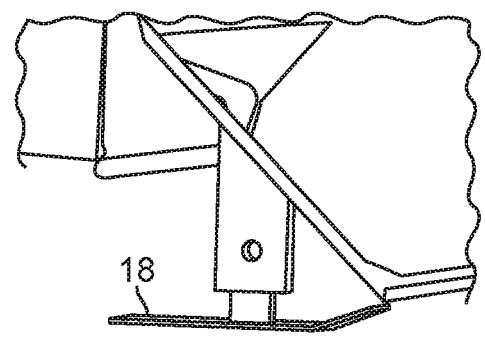

A mower 1 according to the present disclosure has a safety system 7 as schematically shown in FIG. 3. The safety system 7 includes a control unit 8 and at least one detector 9. The detector 9 is adapted to detect a presence of an obstacle 10 in front of the at least one cutter 4 and within a predefined distance from the at least one cutter 4, and to provide a warning signal 11 to the control unit 8 when the presence of the obstacle 10 is detected. The safety system 7 further includes at least one safety device 12 adapted to cause a separation between the obstacle 10 and the at least one cutter 4 while the mower 1 is moved forwards. The control unit 8 provides a separation signal 13 to the at least one safety device 12 in response to receiving the warning signal 11, and the at least one safety device 12 causes the separation in response to receiving the separation signal 13. The safety system 7 is configured so that the separation is caused fast enough to ensure that the obstacle 10 is not hit by the at least one cutter 4 while the mower 1 is moved forwards at working speed. The illustrated safety system 7 further includes at least one brake 14 adapted to stop the rotation of the at least one cutter 4. Such a brake is schematically shown as a box in FIG. 3 to just indicate the presence of a brake. Typically, the cutter 4 in the form of rotating blades of a mower 1 is driven by a mechanical driveline directly from a tractor 6 to which the mower 1 is mounted; this is typically described as a Power Take-Off system (PTO). This mechanical driveline can be interrupted by a mechanical clutch (not shown) thereby stopping energy transfer from the tractor 6 to the rotating blades of the cutter 4 and thereby stopping the rotational movement of the blades. This is obtained by the control unit 8 providing a braking signal 15 to the at least one brake 14 in response to receiving the warning signal 11 which results in the rotation of the at least one rotating blade being stopped by the at least one brake 14. The control unit 8 may use machine vision algorithms for fast image analysis and obstacle detection. Such algorithms may also include deep learning techniques.

FIG. 4 schematically shows the functioning of the safety system 7; the bold arrows indicate the moving direction of the mower 1. FIG. 4A shows a part of the mower 1 in the form of a cutter 4 and an upper part 16 of the mower 1; the carrier and the rest of the mower are not included in this figure. FIG. 4B shows how the cutter 4 of a mower 1 without a safety system 7 can hit an obstacle 10 in front of the mower 1. FIG. 4C shows a mower 1 provided with a detector 9, e.g., in the form of a camera, arranged on the upper part 16 of the mower 1. The mower 1 is further protected with a safety device in the form of a shield 17 which is moved from a retracted position (not shown in this figure) in which it does not cover the at least one cutter 4, to a protecting position as shown in FIG. 4D. In the protecting position, the shield 17 extends in front of the at least one cutter 4 to prevent contact between the at least one cutter 4 and the obstacle 10. The shield 17 should preferably extend to as close to the ground as possible to ensure that the obstacle 10 cannot enter underneath the shield 17 and thereby be hit by the at least one cutter 4. To prevent the shield 17 from being dug into the ground, it may be provided with ski-like components 18 extending substantially horizontally and enabling them to slide along the ground. An example of such a ski-like component 18 is shown schematically in FIG. 4E.

Figure 5A:
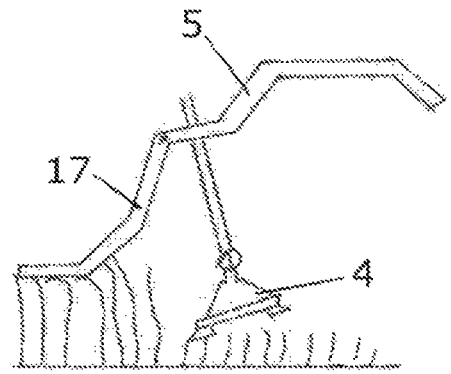
FIGS. 5A-5B schematically show partial views of a carrier with a cutter and a shield in a retracted position and protecting position, respectively.
Figure 5B:
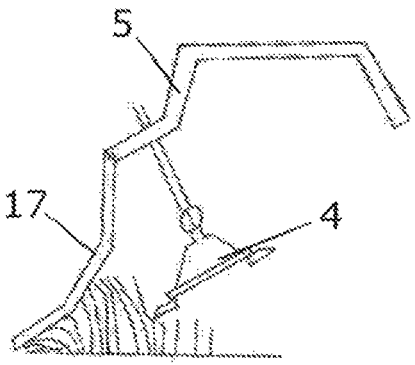

FIG. 5 schematically shows a partial view of an embodiment wherein the at least one shield 17 is in the form of a shovel which is curved or bent away from the at least one cutter 4 so that a lower part of the shovel can be moved at least partly underneath the obstacle 10. As illustrated, the at least one shield 17 is hinged to the carrier and moved from the retracted position in FIG. 5A to the protecting position in FIG. 5B. This movement may be obtained by at least one shield actuator 19; see FIGS. 7A-7B and the description thereof below.

Figure 6A:
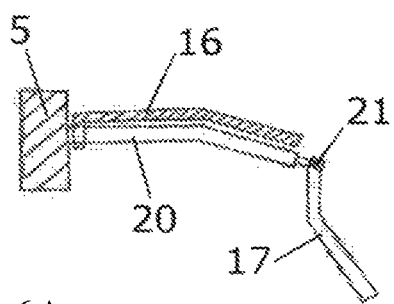
FIGS. 6A-6B schematically show two possible ways of mounting a shield to an existing carrier of a mower.
Figure 6B:
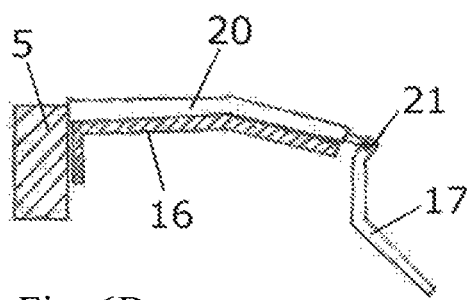

FIG. 6 schematically and in partial cross-sectional view shows two possible ways of mounting a shield 17 on a carrier 5 of an existing mower 1 having an upper part 16 extending above the cutters 4; this upper part 16 is also referred to as a lid. The existing parts, but not the shield 17 and the mounting thereof, are shown hatched for illustrative purposes only. The shield 17 can, e.g., be mounted by use of a profile 20, such as a square-profile 20, to which it is hingedly mounted. FIG. 6A shows a solution in which the shield 17 is mounted by arranging a square-profile 20 under the lid 16 of the mower 1. This square-profile 20 will typically be welded onto the carrier 5 typically extending in the middle of the mower 1. A disadvantage of this solution is that it is necessary cut a hole in the lid 16 before the square-profile 20 can be welded onto the carrier 5. On the other hand, an advantage of this solution is that it is possible to lift the lid 16 and reach the cutter 4, which is very timesaving when the rotating blades of the cutter 4 have to be changed. FIG. 6B shows a solution in which the shield 17 is mounted by arranging a profile 20, such as a square-profile 20, on top of the lid 16 of the mower 1. A disadvantage of this solution is that the lid 16 cannot easily be lifted, e.g., for inspection or replacement of the cutter 4. On the other hand, an advantage of choosing this mounting method is that cutting holes in the current construction can be avoided and it that is easier to reach the square-profile 20 if something were to happen. Based on the present experience with the devices of this disclosure, the design in FIG. 6A is on a whole considered most advantageous. However, both alternatives are covered by the present disclosure.

Figure 7A:
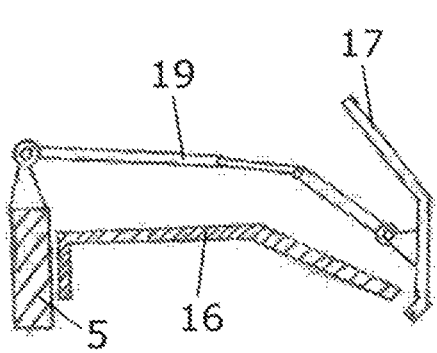
FIGS. 7A-7B schematically show how a shield actuator can be used to move a shield from a retracted position to a protecting position.
Figure 7B:
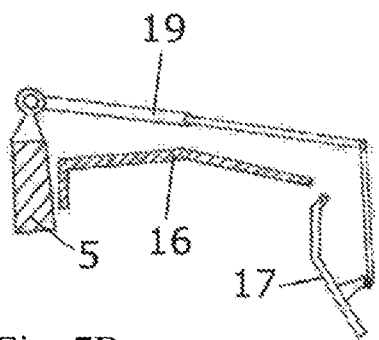

In the embodiments in FIGS. 6A-6B, the hinge-connection 21 between the at least one shield 17 and the carrier 5 is located at the end of the square-profile 20 instead of directly at the carrier 5. However, also for this embodiment, the shield 17 can be moved from the retracted position to the protecting position by at least one shield actuator 19. A possible arrangement of such a shield actuator 19 is schematically shown in FIGS. 7A-7B, showing the shield actuator 19 mounted to an upper surface of the carrier 5. The retracted position is shown in FIG. 7A, and the extended position is shown in FIG. 7B. When a specific design of a shield 17 is determined, a number of design parameters must be taken into account. For example, it must be ensured that the shield 17 does not collide with other parts of the mower 1 and the tractor 6 neither during use, i.e., during mowing, nor during transportation. In relation to "during use" both the retracted and the extended position of the shield 17 must be taken into account. Furthermore, it must be ensured that the shield 17 can remain as stable as possible in situations where it is moving a hit obstacle 10 forwards until the mower 1 has been stopped. Such a design process will typically be performed by use of computer simulations combined with experimentation and testing of prototypes.

Figure 8A:
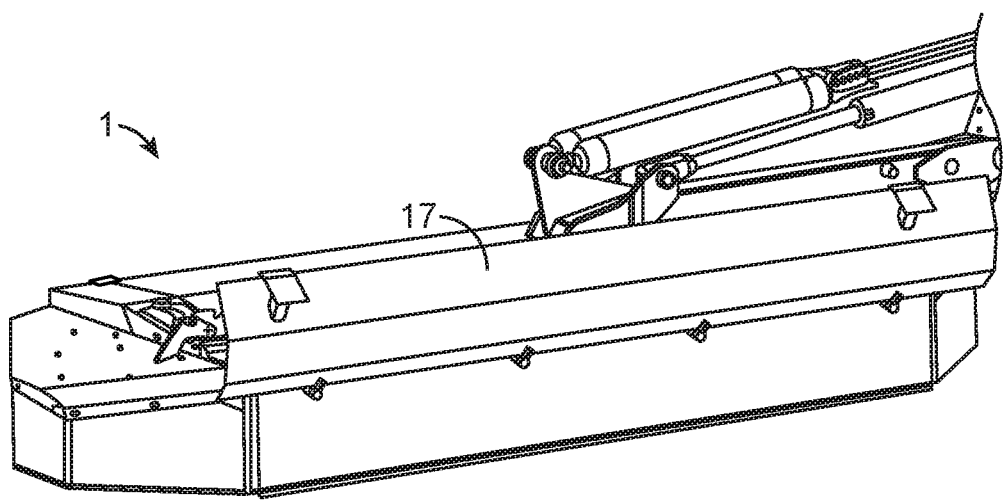
FIGS. 8A-8C show 3D-models of a mower with a shield.
Figure 8B:
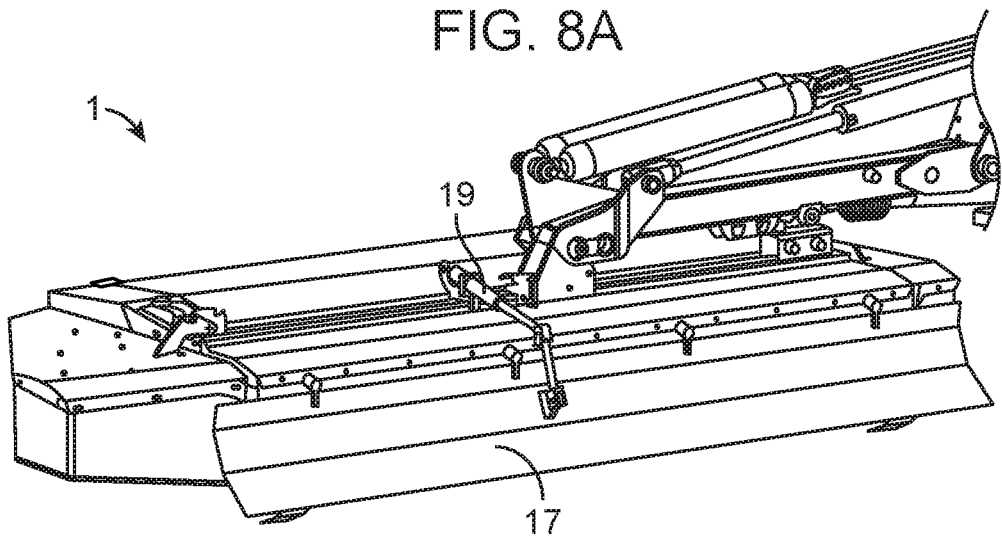
Figure 8C:
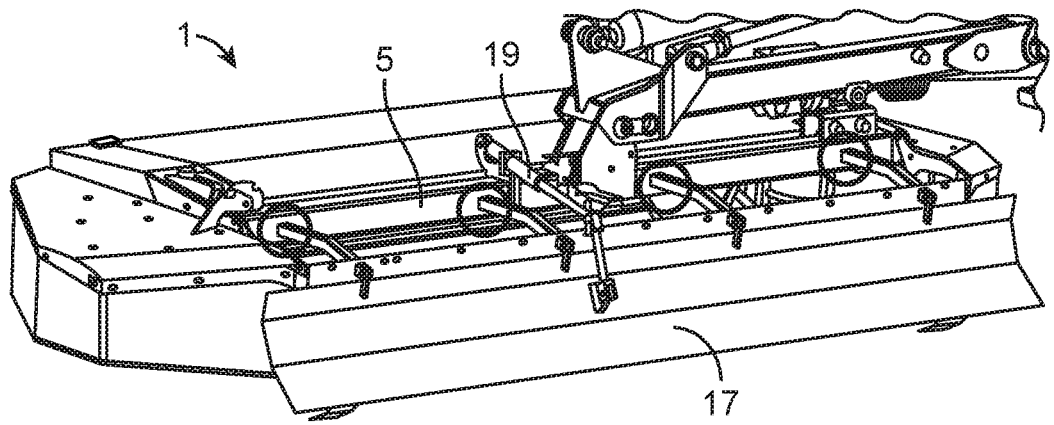

FIGS. 8A-8C schematically show 3D-models of a mower 1 with a safety device 12 in the form of a shield 17 as described above. FIG. 8A shows the shield 17 in the retracted position, and FIG. 8B shows the shield 17 in the protecting position in which it extends in front of a row of rotating blades. The circles in FIG. 8C indicate where the shield 17 is mounted to the carrier 5 as explained in the description of FIGS. 6A-6B. In the illustrated embodiment, the shield 17 is fastened at four positions along the carrier 5; however, it may be fastened by more or fewer positions depending on the dimensions and expected forces to be exerted thereon and thereby the needed stiffness. The illustrated shield 17 is moved between the retracted and the extended positions by one shield actuator 19, but there may also be more than one shield actuator 19 if considered necessary to ensure a fast and safe movement of the shield 17.

Figure 9:
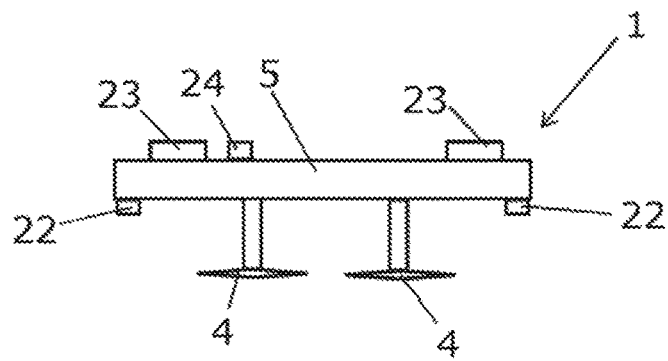
FIG. 9 schematically shows an embodiment in which the at least one safety device includes at least one airbag.

An alternative embodiment to the one described above is schematically shown in FIG. 9. In this embodiment, the at least one safety device 12 includes at least one airbag 22 which, upon activation, by receipt of the separation signal 13, expands and thereby lifts the carrier 5 with the at least one cutter 4 to such a height above the field that the at least one cutter 4 can pass above the obstacle 10 without hitting it. Depending on the size and the weight of components to be lifted, the number and lifting effect will be determined as part of the design of the mower 1. For large equipment, it will typically be necessary to have more than one airbag 22 per carrier 5, such as having at least an airbag 22 at each of the two ends of the carrier 5 as schematically shown in FIG. 9. The necessary very fast expansion of the airbag 22 is obtained by having a pre-compression tank 23 enabling a fast expansion. When an airbag 22 has been activated, it must subsequently be reversed before continuing mowing. This reversion is typically obtained by a small pump 24 pumping gas into the pre-compression tank 23. In FIG. 9, two pre-compression tanks 23 and one pump 24 are schematically shown as arranged on an upper surface of the carrier 5; this may not be the location in a real mower. In alternative embodiments without such a pump and pre-compression tank, it may be necessary to replace the airbag after activation thereof.

Figure 10:
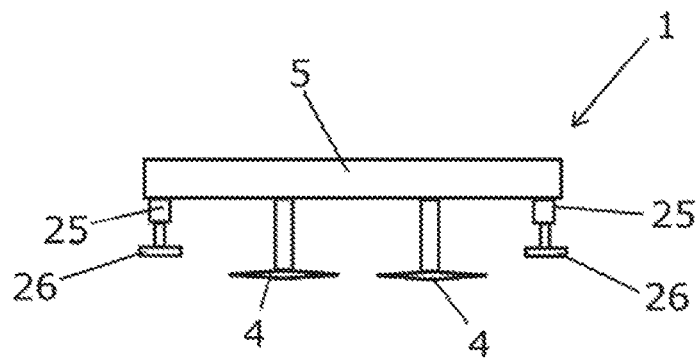
FIG. 10 schematically shows an embodiment in which the at least one safety device includes at least one slider actuator.

Another alternative embodiment is schematically shown in FIG. 10. In this embodiment, the at least one safety device 12 includes at least one slider actuator 25 with an upper end connected to the carrier 5, and at least one slider 26 mounted at a lower end of the slider actuator 25. The separation signal 13 provided by the control unit 8 upon receipt of a warning signal 11 actuates the slider actuator 25 to assume an extended state. When the slider actuator 25 is in this state, the slider 26 slides along the field 2 while the carrier 5 is lifted to such a height that the at least one cutter 4 can pass above the obstacle 10 without hitting it. The slider 26 may, e.g., have the shape of a ski as shown for the slider in FIG. 4E; however, other shapes are also covered. The movement of the slider actuator 25 from a retracted to the extended state is typically driven by, e.g., an electrical or hydraulic motor/actuator (not shown) controlled by the control unit 8. When the mower 1 has passed the obstacle 10, the slider actuator 25 is retracted again resulting in the carrier 5 returning to a normal working condition. This retraction may be controlled by the control unit 8 providing a retraction signal to the actuator 25.

Figure 11:
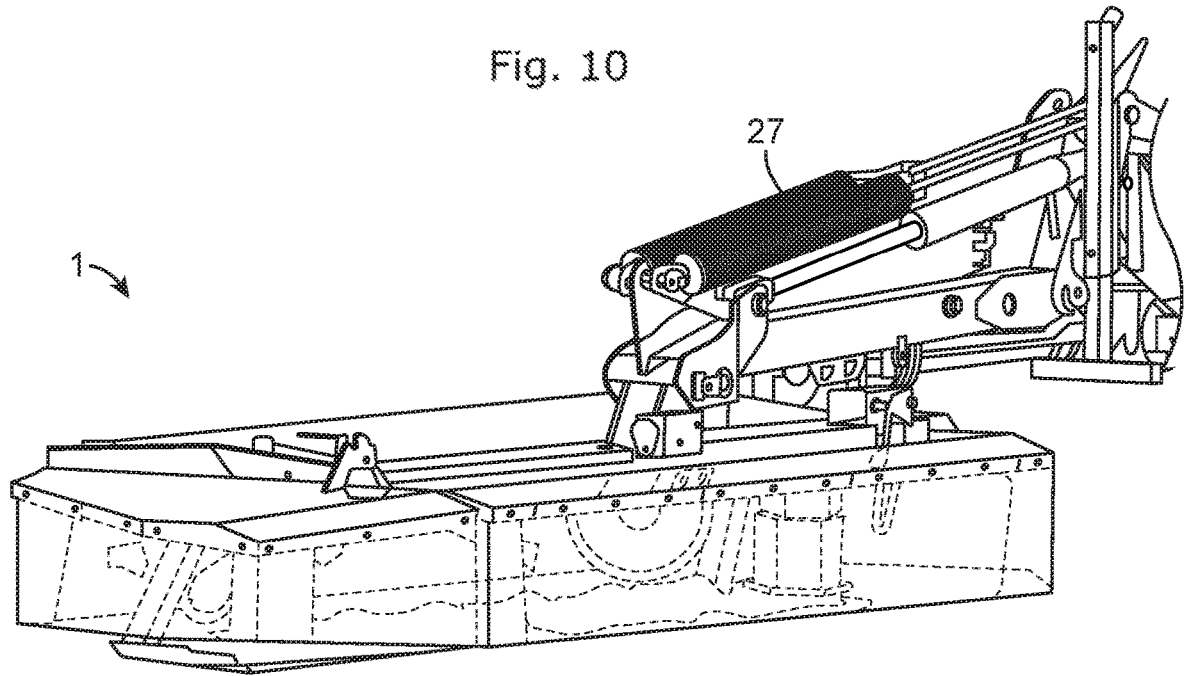
FIG. 11 schematically show two embodiments in which the at least one safety device includes at least one pivot actuator adapted to pivotally move the carrier with the at least one cutter into a non-working position in which the at least one cutter does not hit the obstacle.

In other alternative embodiments than those described above, the at least one safety device 12 includes at least one pivot actuator 27 adapted to pivotally move the carrier 5 with the at least one cutter 4 into a non-working position in which the at least one cutter 4 does not hit the obstacle 10. It may, e.g., be the same pivot actuator 27 as used when the carrier 5 is moved into transportation orientation. FIG. 11 schematically shows such an embodiment in which the non-working position is obtained by pivoting the carrier 5 around a substantially horizontal axis so that the at least one cutter 4 is lifted to a higher position in relation to the field 2. In an alternative embodiment (not shown), the non-working position is obtained by pivoting the carrier 5 around a substantially vertical axis so that the at least one cutter 4 is moved in an opposite direction of a moving direction of the mower 1.

In any of the embodiments as described above, the at least one detector 9 is typically selected from the group consisting of: RGB camera, thermal camera, radar, and laser. However, any kind of detector 9 with the necessary performance is covered. The working principles of these different types of detectors 9 will be well known to a person skilled in the art. As described above, the at least one detector 9 is arranged so that it can detect the presence of an obstacle 10 in front of the at least one cutter 4 and within a predefined distance from the at least one cutter 4. The at least one detector 9 is connected to the control unit 8 and adapted to provide a warning signal 11 to the control unit 8 when the presence of an obstacle 10 is detected. The actual number of detectors 9 needed for a given mower 1 as well as the specific positioning thereof will depend on the design and size of the mower 1. Tests being performed in relation to the present disclosure have shown that radars set to the right wavelength can detect stones and steel fully covered by biomass, such as plants.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. In addition, the mentioning of references such as "a" or "an" etc. should not be construed as excluding a plurality. The use of reference signs in the claims with respect to elements indicated in the figures shall also not be construed as limiting the scope of the invention.

Furthermore, individual features mentioned in different claims, may possibly be advantageously combined, and the mentioning of these features in different claims does not exclude that a combination of features is not possible and advantageous.

That which is claimed is:

1. A mower adapted to be moved along a field with plants to be cut, the mower comprising:
 a carrier and at least one cutter mounted on the mower via the carrier and adapted to cut the plants; and
 a safety system comprising
  a control unit,
  at least one detector adapted to
   detect a presence of an obstacle in front of the at least one cutter and within a predefined distance from the at least one cutter, and
   provide a warning signal to the control unit when the presence of the obstacle is detected, and
  at least one safety device adapted to cause a separation between the obstacle and the at least one cutter when the mower is moved forwards,
  wherein the control unit is configured to provide a separation signal to the at least one safety device in response to receiving the warning signal;
  wherein the at least one safety device is configured to cause the separation in response to receiving the separation signal;
  wherein the safety system is configured so that the separation is caused fast enough to ensure that the obstacle is not hit by the at least one cutter while the mower is moved forwards at working speed;
  wherein said at least one safety device comprises
   at least one shield which is movable between a retracted position in which said at least one shield does not cover the at least one cutter and a protecting position in which said at least one shield extends in front of the at least one cutter to prevent contact between the at least one cutter and the obstacle,
  and/or
   at least one slider actuator with an upper end connected to the carrier, and
   at least one slider mounted at a lower end of the slider actuator,
   wherein the separation signal actuates the slider actuator to assume an extended state so that the slider can slide along the field while the carrier is lifted to such a height that the at least one cutter can pass above the obstacle without hitting said obstacle.

2. A mower according to claim 1, wherein the at least one shield comprises a shovel which is curved or bent away from the at least one cutter so that a lower part of the shovel can be moved at least partly underneath the obstacle.

3. A mower according to claim 1, wherein the at least one shield is hinged to the carrier or to an upper part of the mower and movable from the retracted position to the protecting position by at least one shield actuator.

4. A mower according to claim 1, wherein the at least one safety device comprises at least one airbag which, upon activation, by receipt of the separation signal, expands and thereby lifts the carrier with the at least one cutter to such a height above the field that the at least one cutter can pass above the obstacle without hitting it.

5. A mower according to claim 1, wherein the at least one safety device comprises at least one pivot actuator adapted to pivotally move the carrier with the at least one cutter into a non-working position in which the at least one cutter does not hit the obstacle.

6. A mower according to claim 5, wherein the non-working position is obtained by pivoting the carrier around a substantially horizontal axis so that the at least one cutter is lifted to a higher position in relation to the field.

7. A mower according to claim 5, wherein the non-working position is obtained by pivoting the carrier around a substantially vertical axis so that the at least one cutter is moved in an opposite direction of a moving direction of the mower.

8. A mower according to claim 1, wherein the at least one detector is selected from the group consisting of a RGB camera, a thermal camera, radar, and a laser.

9. A mower according to claim 1, wherein the at least one cutter comprises at least one rotating blade.

10. The mower according to claim 9, wherein the safety system further comprises at least one brake adapted to stop the rotation of the at least one rotating blade, and wherein the control unit is configured to provide a braking signal to the at least one brake in response to receiving the warning signal which results in the rotation of the at least one rotating blade being stopped by the at least one brake.

* * * * *